United States Patent [19]

Duby et al.

[11] Patent Number: 5,262,189
[45] Date of Patent: Nov. 16, 1993

[54] PROCESS FOR FLAVORING FOODS WITH 2-CARBOMETHOXY-1-PYRROLINE

[75] Inventors: Philippe Duby, Prilly; Tuong Huynh-Ba, Pully, both of Switzerland

[73] Assignee: Nestec S.A., Vevey, Switzerland

[21] Appl. No.: 955,677

[22] Filed: Oct. 2, 1992

[30] Foreign Application Priority Data

Oct. 3, 1991 [CH] Switzerland .................. 02 925/91-0

[51] Int. Cl.$^5$ ............................................ H23L 1/226
[52] U.S. Cl. ................................................. 426/537
[58] Field of Search ........................................ 426/537

*Primary Examiner*—Joseph Golian
*Attorney, Agent, or Firm*—Vogt & O'Donnell

[57] ABSTRACT

2-Carbomethoxy-1-pyrroline is used as a flavoring agent for food products.

5 Claims, No Drawings

PROCESS FOR FLAVORING FOODS WITH 2-CARBOMETHOXY-1-PYRROLINE

BACKGROUND OF THE INVENTION

This invention relates to the use of 2-carbomethoxy-1-pyrroline, primarily in the food sector.

2-Carbomethoxy-1-pyrroline is known inter alia from the Article by Poisel and Schmidt in Chem. Ber. (1975), 108, 2547–2553.

SUMMARY OF THE INVENTION

It has surprisingly been found that 2-carbomethoxy-1-pyrroline has particular organoleptic qualities suitable for application in foods. These organoleptic characteristics may be described as follows: odor of breadcrust, bakeries, grilled and fruity, flowery, patisseries.

It has been found that 2-carbomethoxy-1-pyrroline be used with advantage to modify, strengthen and/or enhance the taste and aroma of various food products, such as rice, corn or bread, by developing notes of the grilled or breadcrust type. It has also been found that 2-carbomethoxy-1-pyrroline is capable of developing and/or exhausting notes as varied as those of the "hazelnut", "lardoon" or "milkbutter" type or even of the "cereal" type.

In a first embodiment, therefore, the present invention relates to 2-carbomethoxy-1-pyrroline as a flavoring agent capable of being added to a food product.

In a second embodiment, the invention relates to the use of 2-carbomethoxy-1-pyrroline in a flavoring composition capable of being added to a food product.

One advantage of the invention lies in the use of a compound that is easy to prepare and purify so that it can be produced on a large scale.

Another advantage lies in the use of a chemically stable compound which can be stored for long periods with no risk of degradation.

According to the invention, therefore, 2-carbomethoxy-1-pyrroline may be used on its own as a flavoring agent. The quantity to be added to a food product will depend principally on the nature of the product and on the desired final effect. Quantities of 10 to 100 ppm of 2-carbomethoxy-1-pyrroline are preferably added to the food product.

The 2-carbomethoxy-1-pyrroline may also be used in the preparation of a flavoring composition. For example, it may be used in the preparation of a flavoring composition which contains from 1 to 5% by weight 2-carbomethoxy-1-pyrroline and which has a corn, bread or potato flavor. The composition thus obtained may be added to the end food product in a quantity of 1 to 2 grams per kilo of end product.

EXAMPLES

The invention is illustrated by the following Examples in which parts and percentages are by weight.

EXAMPLE 1

2-carbomethoxy-1-pyrroline is prepared by the method described by Poisel and Schmidt in Chem. Ber. (1975), 108, 2547.

Several aqueous solutions containing 2-carbomethoxy-1-pyrroline in various concentrations are prepared.

50 ml of each solution are presented in 250 ml Erlenmeyer flasks closed by a cover to 15 tasters trained in the analysis of flavors.

The test is carried out as follows:

Three flasks are presented to each taster: one flask containing the aromatic solution and two flasks containing water. The taster has to sniff the head space and designate the flask containing the aromatic solution. The test is repeated twice for concentrations of 0.75, 1.5, 3.0 and 6.0 ppm.

The perception threshold by direct olfaction, i.e., the concentration for which there is 50% perception, is determined at approximately 1.8 ppm for 2-carbomethoxy-1-pyrroline, after compilation of the results in the form of a regression curve.

By way of comparison, it was found that even pure 2 1-carbethoxy-1-pyrroline does not have any flavor.

EXAMPLE 2

The minimum olfactorily detectable quantity of 2-carbomethoxy-1-pyrroline is determined by GC sniffing. To this end, aqueous solutions containing 2-carbomethoxy-1-pyrroline in various concentrations are analyzed by gas phase chromatography. The gaseous effluent is divided in half between a flame ionization detector and an external outlet allowing olfactory detection. An HP 5880 a chromatograph is used and the analytical conditions are as follows:

| | |
|---|---|
| capillary column: | DB wax, 30 m, 0.25 mm d.i. |
| injection: | 1 μl into the column |
| kiln temperature: | 50° C. (1 min.) to 150° C. at 4° C. per minute |
| detection: | flame ionization, 250° C. sniffing port, interface 200° C. |

A group of 6 people sniff injections of 1 μl of solutions containing 2, 4 and 20 ng/ml 2-carbomethoxy-1-pyrroline (respectively corresponding to 1, 2 and 10 pg 2-carbomethoxy-1-pyrroline) three times at the external outlet of the chromatograph.

The following results are obtained:

| Quantity of product (pg) | 1 | 2 | 10 |
|---|---|---|---|
| Positive olfaction (%) | 0 | 60 | 100 |

If the perception threshold is fixed at 50% positive responses, the threshold obtained is 2 pg (+/−0.6 pg).

Given an air flow rate of 50 ml per minute at the olfactory detector and a width of the chromatographic peak of approximately 5 seconds, the perception threshold works out at 0.5 pg/ml air (+/−0.15 pg).

EXAMPLE 3

An aqueous solution containing 50 g/l 2-carbomethoxy-1-pyrroline is prepared. 1 ml of this solution is added to 1 kg polenta prepared beforehand and the whole is left standing for 10 minutes. The test polenta thus prepared and a control polenta with no 2-carbomethoxy-1-pyrroline added are presented to a group of 10 pre-informed tasters. The test polenta has characteristic notes described as "whole bread", "cereal" and "breadcrust" which are not present in the control polenta.

EXAMPLE 4

100 g rice are cooked in 1 liter water. The rice is drained after cooking and the cooking water is recovered. An aqueous solution containing 50 g 2-carbomethoxy-1-pyrroline per liter water is prepared. 0.2 ml of this solution is added to 200 ml of the rice cooking water. The mixture is presented to a group of 10 pre-informed tasters. By comparison with a control cooking water, the test cooking water is found to have enhanced "cereal" and "perfumed rice" notes.

EXAMPLE 5

1 ml of an aqueous solution containing 50 g/l 2-carbomethoxy-1-pyrroline is added to 1 liter of sweetcorn drainage juice in a can. By comparison with a natural juice, the test juice thus prepared has a fresh "corn" note and an exhausted "buttered milk" note.

EXAMPLE 6

A flavoring composition of the "breadcrust" type is prepared by adding the following compounds to 1 liter ethanol:
50 g 2-acetyl pyrazine
10 g 2-acetyl thiazole
30 g diacetyl
5 g 2-ethyl-3-methyl pyrazine.

0.1 g of this composition is added to 1 liter water salted beforehand with 3 g NaCl per liter. The aqueous mixture is divided into two batches of 500 ml. 0.5 ml of an aqueous solution containing 50 g/l 2-carbomethoxy-1-pyrroline is added to the first batch. The second batch is used as control. The two batches are compared by a panel of 10 people. The first batch appears better than the second with enhanced notes of the "cereal" and "breadcrust" type and a rounded "grilled" note.

EXAMPLE 7

A flavoring composition of the "corn" type is prepared by adding the following compounds to 1 liter ethanol:
0.5 g diacetyl
5 g 2-acetyl pyrazine
5 g 2-acetyl thiazole
20 g diamethyl sulfide 0.1 g of this composition is added to 1 liter water salted with 3 g NaCl per liter. The aqueous mixture is divided into two batches of 500 ml. 0.5 ml of an aqueous solution containing 50 g/l 2-carbomethoxy-1-pyrroline is added to the first batch. The second batch is used as control. The two batches are compared by a panel of 10 people. The first batch appears better than the second with enhanced "fresh", slight "grilled corn" and "starch" notes.

EXAMPLE 8

A flavoring composition of the "potato crisp" type is prepared by adding the following compounds to 1 liter ethanol:
5 g trimethyl pyrazine
2 g 2-ethyl-3-methoxypyrazine
0.5 g diacetyl
50 g 3-(methyl-thio)propanal
5 g 2-acetyl thiazole.

0.1 g of this composition is added to 1 liter water salted beforehand with 3 g NaCl per liter. The aqueous mixture is divided into, two batches of 500 ml. 0.5 ml of an aqueous solution containing 50 g/l 2-carbomethoxy-1-pyrroline is added to the first batch. The second batch is used as control. The two batches are compared by a panel of 10 people. The first batch appears better than the second and has a more complete and "browned" type.

EXAMPLE 9

A flavoring composition of the "rice" type is prepared by adding the following compounds to 1 liter ethanol:
1 g benzaldehyde
5 g hexanal
1 g 4-vinyl guaiacol
5 g decanal
30 g 2-acetyl pyrazine
30 g 2-acetyl thiazole 0.1 g of this composition is added to 1 liter water salted beforehand with 3 g NaCl per liter. The aqueous mixture is divided into two batches of 500 ml. 0.5 ml of an aqueous solution containing 50 g/l 2-carbomethoxy-1-pyrroline is added to the first batch. The second batch is used as control. The two batches are compared by a panel of 10 people. The first batch is more of the "basmati rice" type than the second batch with "bread" and "cereal" notes.

The invention described above may be modified, and may, in particular, be made without departing from the spirit and scope of the disclosure, and the invention may be practiced in the absence of elements, reagents and manipulative steps not specifically disclosed herein.

We claim:

1. A process for flavoring a food composition comprising adding 2-carbomethoxy-1-pyrroline to a food to flavor the food.

2. A process according to claim 1 wherein the 2-carbomethoxy-1-pyrroline is added to the food in an amount of from 10 parts per million to 100 parts per million.

3. A process according to claim 1 wherein the 2-carbomethoxy-1-pyrroline added to the food is in an aqueous solution.

4. A process according to claim 3 wherein the aqueous solution contains from 1% to 5% by weight 2-carbomethoxy-1-pyrroline.

5. A process according to claim 1 wherein the food is polenta.

* * * * *